US012627728B2

(12) United States Patent
Salmatanis et al.

(10) Patent No.: US 12,627,728 B2
(45) Date of Patent: *May 12, 2026

(54) GRAPHICALLY INTEGRATING SENSOR DATA THROUGH EDGE DEVICES

(71) Applicant: Chevron U.S.A. Inc., San Ramon, CA (US)

(72) Inventors: Nikolaos Ioannis Salmatanis, Cyrpess, TX (US); Tyrone Jenkins, Sugar Land, TX (US); Larry A. Bowden, Jr., Houston, TX (US); Lisa Ann Brenskelle, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/634,365

(22) Filed: Apr. 12, 2024

(65) Prior Publication Data

US 2025/0323969 A1 Oct. 16, 2025

(51) Int. Cl.
*H04L 67/10* (2022.01)
*G06F 16/901* (2019.01)

(52) U.S. Cl.
CPC .......... *H04L 67/10* (2013.01); *G06F 16/9024* (2019.01)

(58) Field of Classification Search
CPC .............................. H04L 67/10; G06F 16/9024
See application file for complete search history.

(56) References Cited

U.S. PATENT DOCUMENTS

| | | | |
|---|---|---|---|
| 5,136,876 A | 8/1992 | Taylor | |
| 8,930,150 B2 | 1/2015 | Israeli | |
| 8,963,728 B2 | 2/2015 | Kates | |
| 11,080,982 B1 | 8/2021 | Ennaifar | |
| 2005/0246112 A1 | 11/2005 | Abhulimen | |
| 2007/0209075 A1 | 9/2007 | Coffman | |
| 2014/0121999 A1 | 5/2014 | Bracken | |
| 2015/0371374 A1 | 12/2015 | Zeng | |
| 2016/0281497 A1 | 9/2016 | Tilke | |
| 2017/0024983 A1* | 1/2017 | Reeves ................. G08B 13/02 |
| 2017/0055131 A1 | 2/2017 | Kong | |
| 2017/0223434 A1 | 8/2017 | Goldberg | |
| 2017/0355081 A1 | 12/2017 | Fisher | |

(Continued)

OTHER PUBLICATIONS

PCT International Search Report and Written Opinion for PCT Application No. PCT/US2024/30745 mailed Aug. 28, 2024 (11 pages).

(Continued)

*Primary Examiner* — Hua Fan

(74) *Attorney, Agent, or Firm* — Sheppard, Mullin, Richter & Hampton LLP

(57) ABSTRACT

Different edge devices are connected to different sensors. Individual edge devices locally generate and manage sensor nodes that represent sensors connected to the individual edge devices. Sensor observations from the sensors are received by the edge devices, and the edge devices populate the locally managed sensor nodes based on the received sensor observations. The sensor nodes locally managed by different edge devices form a structured graph, and sensor queries are answered using graph queries on the structured graph. Connections between the nodes of the structured graph are dynamically created based on the graph queries.

20 Claims, 16 Drawing Sheets

(56) References Cited

U.S. PATENT DOCUMENTS

| | | |
|---|---|---|
| 2018/0054490 A1 | 2/2018 | Wadhwa |
| 2018/0259418 A1 | 9/2018 | Dudek |
| 2018/0284012 A1 | 10/2018 | Marta |
| 2018/0300124 A1 | 10/2018 | Malladi |
| 2019/0154535 A1 | 5/2019 | Cole |
| 2019/0169982 A1 | 6/2019 | Hauge |
| 2019/0339159 A1 | 11/2019 | Israelsen |
| 2020/0348659 A1 | 11/2020 | Dong |
| 2021/0004353 A1 | 1/2021 | Jain |
| 2021/0123870 A1 | 4/2021 | Mahajan |
| 2021/0216852 A1 | 7/2021 | Reece |
| 2021/0309539 A1 | 10/2021 | Budampati |
| 2021/0325005 A1 | 10/2021 | Inoue |
| 2021/0404858 A1 | 12/2021 | Maly, Jr. |
| 2022/0082409 A1 | 3/2022 | Ukil |
| 2022/0178783 A1 | 6/2022 | Balatchev |
| 2022/0198911 A1 | 6/2022 | Vadwa |
| 2023/0063604 A1 | 3/2023 | Al Daif |
| 2024/0089716 A1 | 3/2024 | Suzuki |
| 2024/0110840 A1 | 4/2024 | Salmatanis |
| 2024/0110878 A1 | 4/2024 | Salmatanis |
| 2024/0169459 A1 | 5/2024 | Donovan |
| 2024/0403672 A1 | 12/2024 | Bowden, Jr. |

OTHER PUBLICATIONS

PCT International Search Report and Written Opinion for PCT Application No. PCT/US2023/075777 mailed Feb. 7, 2024 (14 pages).

PCT International Search Report and Written Opinion of PCT Applicatioin No. PCT/US2023/075780, mailed Jan. 12, 2024 (8 pages).

Koste et al. Bayesian Data Fusion for Pipeline Leak Detection, 2016, IEEE (Year: 2016) 8 pages.

Ruiz, Leak detection and localization in pipeline networks using machine learning and principal component analysis (Year: 2021) 185 pages.

PCT International Search Report and Written Opinion of PCT Applicatioin No. PCT/US2025/024011, mailed Jun. 17, 2025 (14 pages).

* cited by examiner

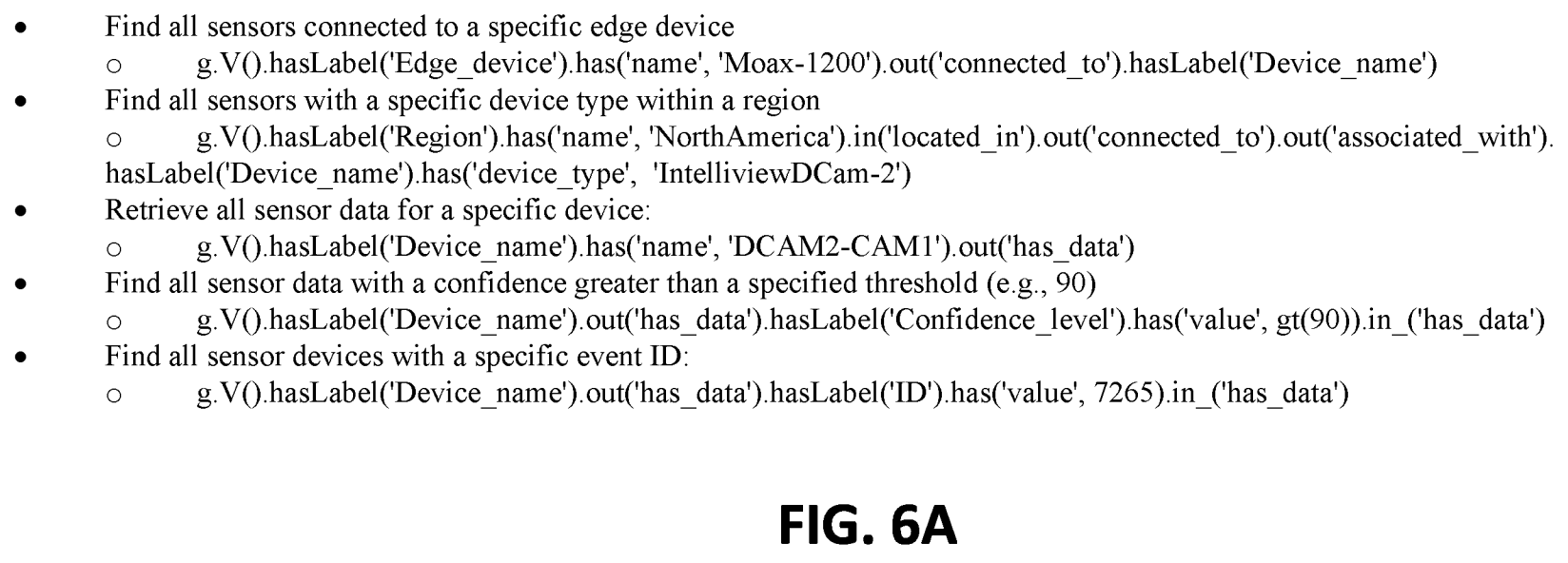

Find all sensors connected to a specific edge device

- o g.V().hasLabel('Edge_device').has('name', 'Moax-1200').out('connected_to').hasLabel('Device_name')

Find all sensors with a specific device type within a region

- o g.V().hasLabel('Region').has('name', 'NorthAmerica').in('located_in').out('connected_to').out('associated_with'). hasLabel('Device_name').has('device_type', 'IntelliviewDCam-2')

Retrieve all sensor data for a specific device:

- o g.V().hasLabel('Device_name').has('name', 'DCAM2-CAM1').out('has_data')

Find all sensor data with a confidence greater than a specified threshold (e.g., 90)

- o g.V().hasLabel('Device_name').out('has_data').hasLabel('Confidence_level').has('value', gt(90)).in_('has_data')

Find all sensor devices with a specific event ID:

- o g.V().hasLabel('Device_name').out('has_data').hasLabel('ID').has('value', 7265).in_('has_data')

FIG. 6A

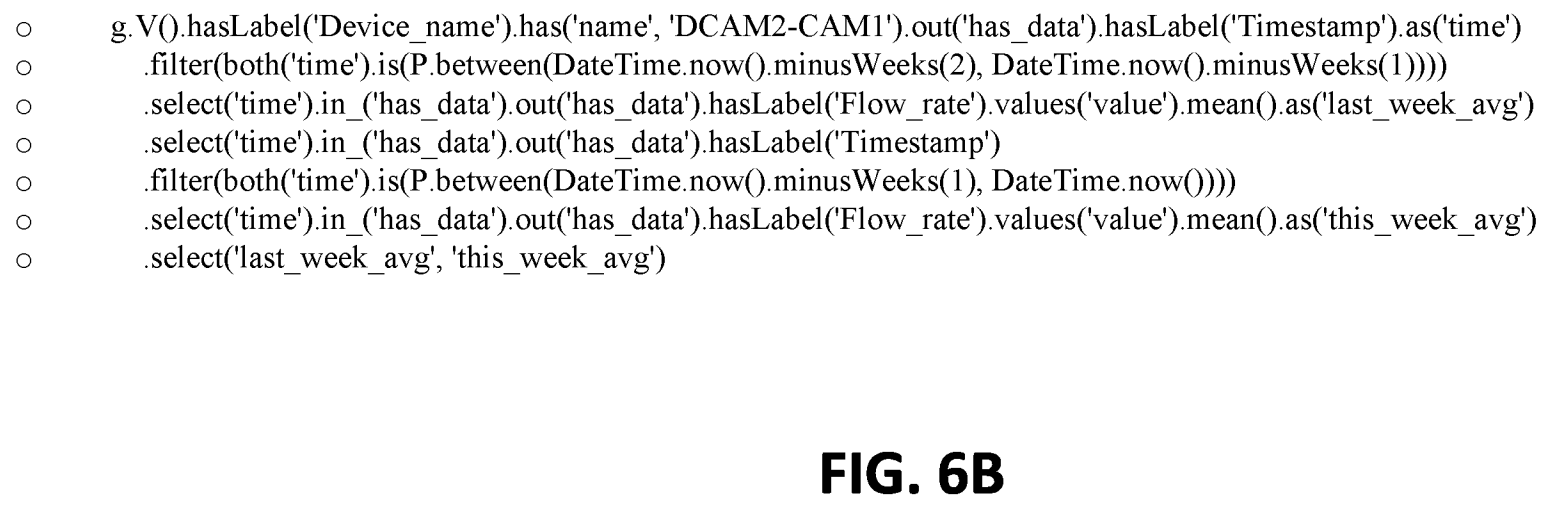

```
g. V().hasLabel('Device_name').has('name', 'DCAM2-CAM1').out('has_data').hasLabel('Timestamp').as('time')
   o .filter(both('time').is(P.between(DateTime.now().minusWeeks(2), DateTime.now().minusWeeks(1))))
   o .select('time').in_('has_data').out('has_data').hasLabel('Flow_rate').values('value').mean().as('last_week_avg')
   o .select('time').in_('has_data').out('has_data').hasLabel('Timestamp')
   o .filter(both('time').is(P.between(DateTime.now().minusWeeks(1), DateTime.now())))
   o .select('time').in_('has_data').out('has_data').hasLabel('Flow_rate').values('value').mean().as('this_week_avg')
   o .select('last_week_avg', 'this_week_avg')
```

FIG. 6B

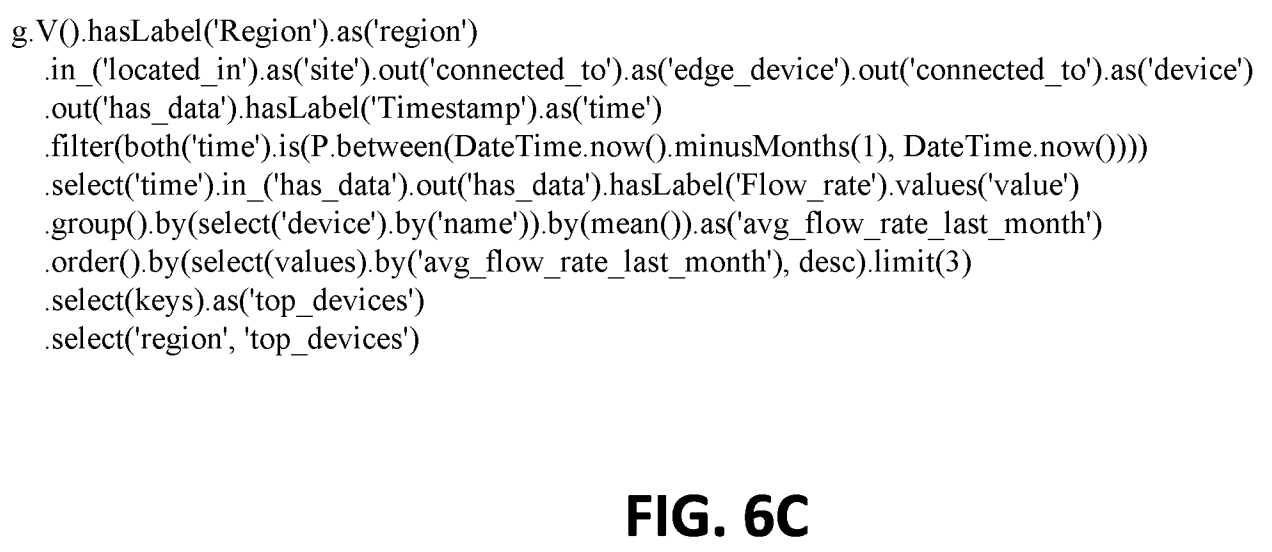

```
g.V().hasLabel('Region').as('region')
.in_(['located_in').as('site').out('connected_to').as('edge_device').out('connected_to').as('device')
.out('has_data').hasLabel('Timestamp').as('time')
.filter(both('time').is(P.between(DateTime.now().minusMonths(1), DateTime.now())))
.select('time').in_(['has_data').out('has_data').hasLabel('Flow_rate').values('value')
.group().by(select('device').by('name')).by(mean()).as('avg_flow_rate_last_month')
.order().by(select(values).by('avg_flow_rate_last_month'), desc).limit(3)
.select(keys).as('top_devices')
.select('region', 'top_devices')
```

FIG. 6C

```
o      # Sensor data graph query
o      sensor_data_query = """
o      g.V().hasLabel('Site').has('name', 'Cannon').as('site')
o          .out('connected_to').hasLabel('Edge_device').as('edge_device')
o          .out('connected_to').hasLabel('Device_name').as('device')
o          .out('has_data').as('sensor_data')
o          .select('site', 'edge_device', 'device', 'sensor_data')
o      """
            sensor_data_result = execute_sensor_data_query(sensor_data_query)
```

FIG. 7A

```
o    # Microsoft Fabric Graph query
o    documents_query = """
o    g.V().hasLabel('Site').has('name', 'Cannon').as('site')
o        .in_('associated_with').hasLabel('Document').as('document')
o        .select('site', 'document')
o    """
o    documents_result = execute_documents_query(documents_query)
```

FIG. 7B

```
o     # Merge the results
o     merged_result = {
o         "site": sensor_data_result["site"],
o         "sensor_data": sensor_data_result,
o         "documents": documents_result
o     }
```

FIG. 7C

```
import sentence_transformers

Load the Sentence-BERT model model = sentence_transformers.SentenceTransformer("paraphrase-distilroberta-
base-v1")

Generate embeddings for the device names for device in graph.devices:

device_name = device.device_name embedding = model.encode(device_name)

device.embedding = embedding
```

FIG. 8A

```python
import numpy as np from scipy.spatial.distance import cosine

Calculate cosine similarity between embeddings def calculate_similarity(emb1, emb2):

return 1 - cosine(emb1, emb2)

Create a new edge/connection if the similarity is above the threshold threshold = 0.9 for device1 in graph.devices:

for device2 in graph.devices:

if device1 != device2:

similarity = calculate_similarity(device1.embedding, device2.embedding)

if similarity > threshold:

graph.add_edge(device1, "similar_to", device2)
```

FIG. 8B o    g.V().hasLabel('Device').has('device_name', 'Device Name').out('similar_to')

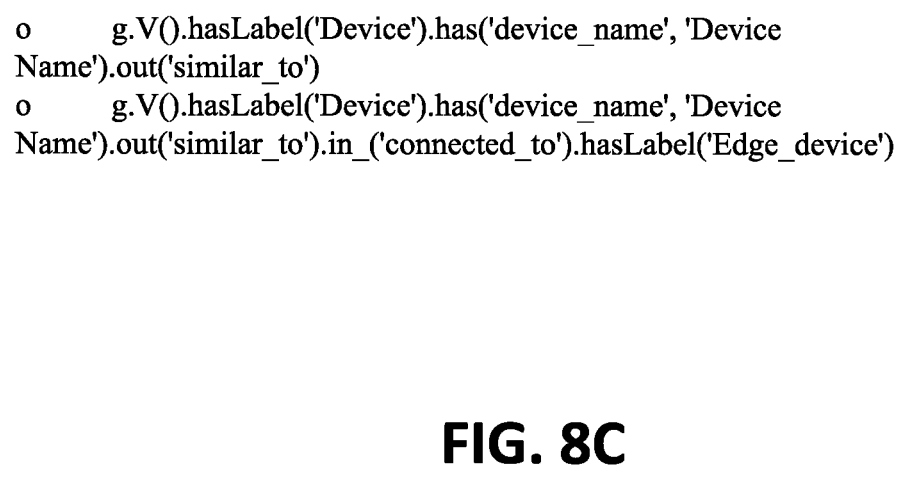

o    g.V().hasLabel('Device').has('device_name', 'Device Name').out('similar_to').in_('connected_to').hasLabel('Edge_device')

FIG. 8C

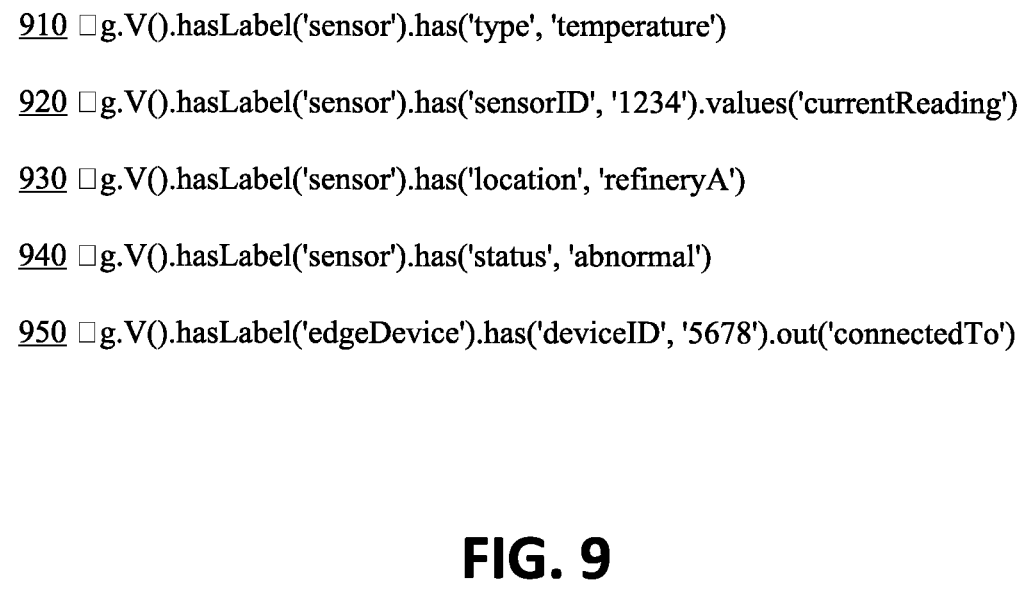

910 ☐ g.V().hasLabel('sensor').has('type', 'temperature')

920 ☐ g.V().hasLabel('sensor').has('sensorID', '1234').values('currentReading')

930 ☐ g.V().hasLabel('sensor').has('location', 'refineryA')

940 ☐ g.V().hasLabel('sensor').has('status', 'abnormal')

950 ☐ g.V().hasLabel('edgeDevice').has('deviceID', '5678').out('connectedTo')

FIG. 9

GRAPHICALLY INTEGRATING SENSOR DATA THROUGH EDGE DEVICES

FIELD

The present disclosure relates generally to the field of graphically integrating sensor data using edge devices.

BACKGROUND

Sensors may be placed in different locations to manage and analyze equipment operations. Manually gathering and parsing sensor data may be difficult and time consuming, and may create a bandwidth communication burden.

SUMMARY

This disclosure relates to graphically integrating sensor data through edge devices. Edge devices may serve as data processing points at the edge of a network. The edge devices may be connected to different sensors, and individual edge devices may locally generate and manage sensor nodes that represent sensors connected to the individual edge devices. Sensor observations from the sensors may be received by the edge devices, and the edge devices may populate the locally managed sensor nodes based on the received sensor observations. The sensor nodes locally managed by different edge devices may form a structured graph, which is a representation of data and the relationships between them. Sensor queries may be answered using graph queries on the structured graph.

A first set of sensors, a second set of sensors, and/or other sets of sensors may make sensor observations. The first set of sensors may include at least a first sensor. The second set of sensors may include at least a second sensor. A first edge device may be connected to the first set of sensors, and a second edge device may be connected to the second set of sensors.

The first edge device may generate a first edge device node for the first edge device and a first set of sensor nodes for the first set of sensors. A first sensor node may be generated for the first sensor. The first set of sensor nodes may be connected to the first edge device node. The second edge device may generate a second edge device node for the second edge device and a second set of sensor nodes for the second set of sensors. A second sensor node may be generated for the second sensor. The second set of sensor nodes may be connected to the second edge device node.

The first edge device may receive the sensor observations made by the first set of sensors, and the second edge device may receive the sensor observations made by the second set of sensors. A first sensor observation made by the first sensor may be received by the first edge device, and a second sensor observation made by the second sensor may be received by the second edge device. The first edge device may populate the first set of sensor nodes based on the sensor observations made by the first set of sensors and/or other information, and the second edge device may populate the second set of sensor nodes based on the sensor observations made by the second set of sensors and/or other information. The first sensor node is populated by the first edge device based on the first sensor observation made by the first sensor and/or other information. The second sensor node may be populated by the second edge device based on the second sensor observation made by the second sensor and/or other information.

The first edge device node, the first set of sensor nodes, the second edge device node, the second set of sensor nodes, and/or other nodes may form a structured graph. A response to a sensor query may be generated based on one or more graph queries on the structured graph and/or other information.

A system for graphically integrating sensor data may include one or more electronic storage, multiple sensors, multiple edge devices, one or more processors, and/or other components. The electronic storage may store information relating to oil/gas assets, information relating to edge devices, information relating to sensors, information relating to sensor observations, information relating to structured graphs, information relating to sensor queries, information relating responses to sensor queries, and/or other information.

Multiple sets of sensors may be configured to make sensor observations. A first set of sensors may be configured to make sensor observations, a second set of sensors may be configured to make sensor observations, and/or other sets of sensors may be configured to make sensor observations. Individual sets of sensors may include one or more sensors. The first set of sensors may include at least a first sensor, and the second set of sensors may include at least a second sensor.

Different sensors/sets of sensors may be connected to different edge devices. A first edge device may be connected to the first set of sensors and a second edge device may be connected to the second set of sensors.

An edge device may include the processor(s) and/or other components. The processor(s) may be configured by machine-readable instructions. Executing the machine-readable instructions may cause the processor(s) to facilitate graphically integrating sensor data through edge devices. The machine-readable instructions may include one or more computer program components. The computer program components may include one or more of a graph component, an observation component, a population component, and/or other computer program components. Performance of an operation by a component of an edge device may include performance of the operation by the edge device, and vice versa.

The graph component of an edge device may be configured to generate an edge device node for the edge device and a set of sensor nodes for the sensor(s) connected to the edge device. The set of sensor nodes may be connected to the edge device node. The graph component of the first edge device may be configured to generate a first edge device node for the first edge device and a first set of sensor nodes for the first set of sensors. A first sensor node may be generated for the first sensor. The first set of sensor nodes may be connected to the first edge device node. The graph component of the second edge device may be configured to generate a second edge device node for the second edge device and a second set of sensor nodes for the second set of sensors. A second sensor node may be generated for the second sensor. The second set of sensor nodes may be connected to the second edge device node.

The observation component of an edge device may be configured to receive the sensor observations made by the sensor(s) connected to the edge device. The observation component of the first edge device may be configured to receive the sensor observations made by the first set of sensors, and the observation component of the second edge device may be configured to receive the sensor observations made by the second set of sensors. A first sensor observation made by the first sensor may be received by the observation component of the first edge device, and a second sensor observation made by the second sensor may be received by the observation component of the second edge device.

The population component of an edge device may be configured to populate the connected sensor node(s) based on the sensor observations made by the sensor(s) connected to the edge device. The population component of the first edge device may be configured to populate the first set of sensor nodes based on the sensor observations made by the first set of sensors and/or other information, and the population component of the second edge device may be configured to populate the second set of sensor nodes based on the sensor observations made by the second set of sensors and/or other information. The first sensor node may be populated by the population component of the first edge device based on the first sensor observation made by the first sensor and/or other information, and the second sensor node may be populated by the population component of the second edge device based on the second sensor observation made by the second sensor and/or other information.

In some implementations, a sensor node for a sensor may be connected to one or more data nodes. Population of the sensor node based on a sensor observation made by the sensor may include population of the data node(s) connected to the sensor node based on the sensor observation made by the sensor. In some implementations, the data node(s) may be generated for the sensor node based on a type of the sensor. The sensor node may be repopulated by the connected edge device responsive to reception, by the connected edge device, of a new sensor observation made by the sensor.

In some implementations, different sensor nodes may be locally managed by the connected edge devices. The first set of sensor nodes may be locally managed by the first edge device, and the second set of sensor nodes may be locally managed by the second edge device.

The edge device nodes, the sensor nodes, and/or other nodes may form a structured graph. The first edge device node, the first set of sensor nodes, the second edge device node, the second set of sensor nodes, and/or other nodes may form a structured graph. One or more responses to a sensor query may be generated based on one or more graph queries on the structured graph and/or other information.

In some implementations, a sensor query may include a relationship query. Two or more unconnected sensor nodes in the structured graph may be dynamically connected based on the relationship query. The response(s) to the sensor query may be generated based on the dynamic connections in the structured graph.

In some implementations, different edge devices may be in different locations. The first edge device may be in a first location, and the second edge device may be in a second location. Different location nodes may be generated for different locations. A first location node may be generated for the first location, and a second location node may be generated for the second location. The edge device nodes may be connected to the location nodes corresponding to the location in which they are located. The first edge device node may be connected to the first location node, and the second edge device node may be connected to the second location node.

In some implementations, different locations may include different parts of an oil/gas asset. The first location may include a first part of an oil/gas asset, and the second location may include a second part of the oil/gas asset. A response to a sensor query may include one or more conditions in different parts (the first part and/or the second part) of the oil/gas asset. One or more operations may be performed at the oil/gas asset based on the condition(s) in different parts (the first part and/or the second part) of the oil/gas asset and/or other information.

In some implementations, one or more other graphs may be connected to the structured graph. The connection of the other graph(s) to the structured graph may expand querying capabilities of the structured graph.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 6A illustrates example graph queries that may be used on the structured graph to identify sensors/sensor data that satisfy one or more criteria.

FIG. 6B illustrates an example graph query to identify changes in data trends by querying for a specific attribute over different time periods.

FIG. 6C illustrates an example graph query to find the top devices with the highest average flowrate change percentage within the last month, grouped by region.

FIG. 7A illustrates an example graph query on a sensor data graph to obtain desired sensor information.

FIG. 7B illustrates an example graph query on an engineering documents graph to obtain engineering documents associated with a desired site.

FIG. 7C illustrates an example code to merge the results of the graph queries shown in FIGS. 7A and 7B.

FIG. 8A illustrates an example code to generate embeddings for device names and store them as a new property in device nodes.

FIG. 8B illustrates an example code to calculate similarity scores for the device names and generate a new edge/connection for nodes based on device name similarity.

FIG. 8C illustrates an example graph query to identify devices with similar names and identify edge devices connected to devices with similar names.

FIG. 9 illustrates example graph queries that may be used in the context of an oil/gas asset.

DETAILED DESCRIPTION

The present disclosure relates to graphically integrating sensor data. Different edge devices are connected to different sensors. Individual edge devices locally generate and manage sensor nodes that represent sensors connected to the individual edge devices. Sensor observations from the sensors are received by the edge devices, and the edge devices populate the locally managed sensor nodes based on the received sensor observations. The sensor nodes locally managed by different edge devices form a structured graph, and sensor queries are answered using graph queries on the structured graph. Connections between the nodes of the structured graph are dynamically created based on the graph queries.

Figure 1:
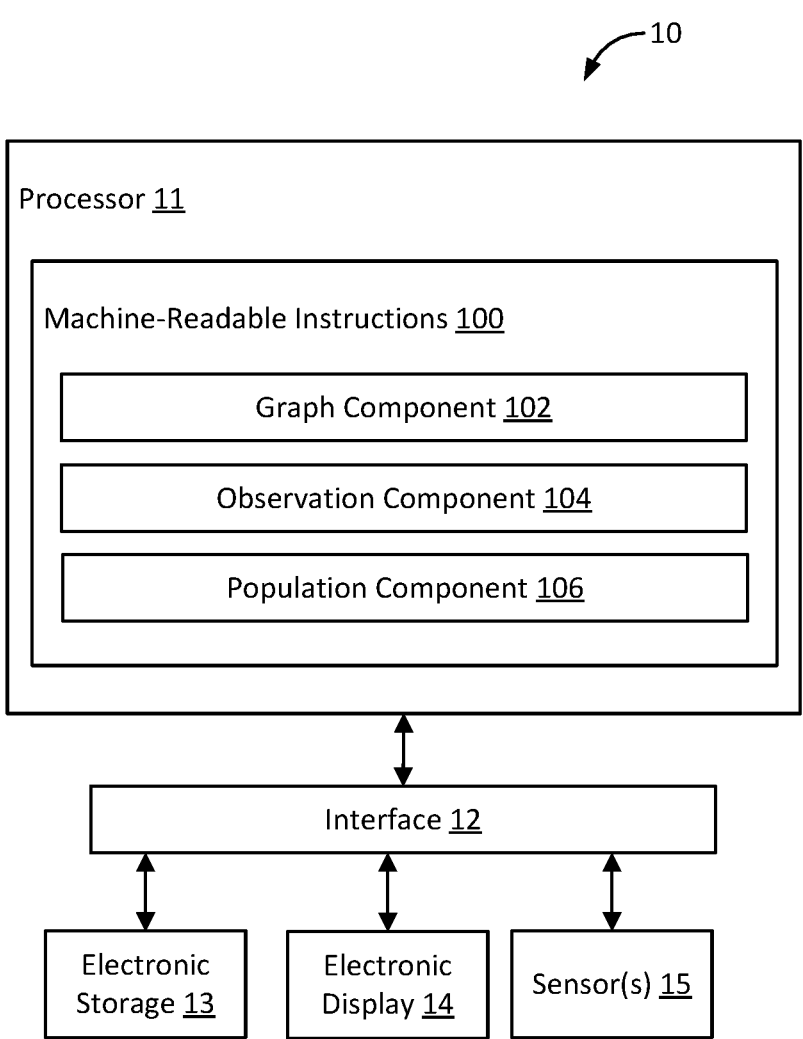
FIG. 1 illustrates an example system for graphically integrating sensor data.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, an electronic display 14, sensor(s) 15, and/or other components. The system 10 may include multiple sensors and multiple edge devices. One or more components of the system 10 shown in FIG. 1 may be part of an edge device. For example, the processor 11 may be part of an edge device.

A set of sensors may include one or more sensors. Different sets of sensors may be connected to different edge devices. For example, an edge device including the processor 11 may be connected to the sensor(s) 15. Connections between the edge device and the sensor(s) 15 may include physical connections and/or wireless connections. Connections between the edge device and the sensor(s) 15 may enable communication between the edge device and the sensor(s). Connections between the edge device and the sensor(s) 15 may enable exchange of information between the edge device and the sensor(s) 15.

Individual edge devices may generate one or more nodes. Individual edge devices may generate an edge device node for itself and a set of sensor nodes for the set of sensors connected to the edge device. The sensor node(s) for the sensor(s) connected to an edge device may be connected to the edge device node for the edge device. For example, the edge device including the processor 11 may generate an edge device node for itself and sensor node(s) for the sensor(s) 15, with the sensor node(s) for the sensor(s) 15 connected to the edge device node.

The sensor(s) 15 may be configured to make sensor observations. Different sets of sensors connected to different edge devices may be configured to make sensor observations. The sensor observations made by the sensors may be received by the edge devices connected to the sensors. For example, the sensor observations made by the sensor(s) 15 may be received by the edge device including the processor 11.

Individual edge devices may populate the sensor node(s) for the sensor(s) connected to the edge devices. The sensor node(s) may be populated based on the sensor observations made by the corresponding sensor(s) and/or other information. For example, the edge device including the processor 11 may populate the sensor node(s) for the sensor(s) 15. The sensor node(s) for the sensor(s) 15 may be populated based on the sensor observations made by the sensor(s) 15, which are received by the edge device.

The edge device nodes and the sensor nodes may form a structured graph. The structured graph may include connections between the edge device nodes and the sensor nodes. A sensor query may be made by a computing device. The computing device that makes the sensor query may include an edge device or a computing device connected (e.g., physically connected, wirelessly connected, connected through a network/the Internet) to an edge device. One or more responses to the sensor query may be generated based on one or more graph queries on the structured graph and/or other information.

The electronic storage 13 may include electronic storage media that electronically stores information. The electronic storage 13 may store software algorithms, information determined by the processor 11, information received remotely, and/or other information that enables the system 10 to function properly. For example, the electronic storage 13 may store information relating to oil/gas assets, information relating to edge devices, information relating to sensors, information relating to sensor observations, information relating to structured graphs, information relating to sensor queries, information relating to responses to sensor queries, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present information relating to oil/gas assets, information relating to edge devices, information relating to sensors, information relating to sensor observations, information relating to structured graphs, information relating to sensor queries, information relating to responses to sensor queries, and/or other information.

Sensors may be deployed to monitor physical things/objects and/or actions. For example, sensors may be deployed to monitor a location, equipment/personnel at the location, operations being performed at the location, and/or other physical aspects of/at the location. Sensors may be deployed in multiple locations to monitor physical things/objects and/or actions in the multiple locations at the same time. Data from different sensors may be used to analyze what is happening in different locations.

However, gathering and parsing sensor data from sensors in different locations may be difficult and time consuming, and may create a bandwidth communication burden. For example, individually communicating with different sensors in different locations may require connection to be established with all the sensors and require numerous messages to be exchanged. Configuration and maintenance of the connections with the individual sensors to enable communication may be difficult and costly (e.g., in time and resources). Determining when and how to communicate with individual sensors may be difficult and costly. Communicating with individual sensors may consume communication bandwidth. Moreover, after the sensor data have been received, parsing the sensor data from different sensors in different locations may be difficult and costly.

The present disclosure provides an automated and low cost solution for integrating sensor data for analysis. Graph schema(s) defined for various sensors connected to edge devices are used to generate nodes (edge device nodes, sensor nodes) and connections between the nodes, sensor nodes are populated by the edge devices responsive to reception of sensor data from the connected sensors. The automation of graph schemas (e.g., Apache TinkerPop schemas) from sensor data (e.g., MQTT sensor data) leverages graph application programming interface (e.g., Gremlin graph API) to create a new Internet of Things (IoT) foundational capability for managing and analyzing distributed/IoT sensor data. The present disclosure provides both improved performance and cost savings for utilizing distributed sensors (e.g., IoT sensors, cloud-connected sensors).

The present disclosure enables generation of coherent data sets out of stranded sensor data coming from disparate sensors of disparate types. Graph technology is used to map the disparate sensor data onto a structured graph, with the connections between the nodes of the structured graph providing context for the sensor data. Nodes of the structured graph are automatically generated based on the connections between the sensors and the edge devices, and the nodes of the structured graph are automatically populated using the received sensor data. The present disclosure enables new capabilities in collection and parsing of the sensor data, and enables new capabilities with the structured graph through graph traversal. The present disclosure is scalable via use of edge devices. The present disclosure enables collection and analysis of sensor data with or without cloud infrastructure. The edge devices can be used to collect and analyze sensor data without cloud dependency to reduce costs and complexity. The edge devices can be used with cloud infrastructure when cost-benefits are positive.

For example, an edge device may receive messages (e.g., JSON messages) from the connected sensors using one or more message protocols (e.g., event-driven message protocols, such as MQTT). The edge device may parse the received messages and automatically populate the corresponding sensor nodes of a graph using a graph schema (e.g., Apache TinkerPop schema). When a new message is received from a connected sensor, the edge device parses the new message and automatically updates the information contained within the corresponding sensor node. This enables real-time processing and analysis of the sensor data. The auto-population and auto-updating of sensor nodes allows the graph to be automatically/dynamically maintained.

The graph may be traversed using a graph query language (e.g., Gremlin). The graph query language may be used to extract insights of sensor data stored in the graph via graph mathematics and logic. This enhances querying capabilities for the sensor data and enables efficient sensor data representation. The system is scalable and suitable for large-scale distributed/IoT deployments of sensors. The graphs of the present disclosure (sensor graphs) are flexible and are able to be connected to other graphs/other types of graphs (e.g., graphs with nodes representing documents, media items, equipment). Connection of the sensor graphs to other types of graphs (e.g., document graphs, media item graphs, equipment graphs) enables graph queries to explore relationships between sensor data and other types of data to provide context-rich insights. Connections between nodes/graphs may be generated dynamically to explore different relationships between sensors/other types of things.

While some implementations of the present disclosure are described with respect to sensor data, this is merely an example and is not meant to be limiting. The present disclosure may be applied to other types of data/data from other types of devices. Reception of other types of data, generation and population of other types of nodes, and generation of responses to other types of queries using a structured graph are contemplated.

While some implementations of the present disclosure are described with respect to edge devices, this is merely an example and is not meant to be limiting. The present disclosure may be applied using other types of computing devices. For example, some or all of the functionality of the edge devices described herein may be implemented in other computing devices (e.g., in the cloud).

While some implementations of the present disclosure are described with respect to oil/gas assets, this is merely an example and is not meant to be limiting. The present disclosure may be applied to other types of assets, equipment, and/or technology. For example, the present disclosure may be utilized for connected vehicle infrastructure to collect and graphically integrate vehicle sensor data to provide real-time traffic recommendations, predict maintenance, and/or provide personalized services. The present disclosure may be utilized for smart cities/buildings to collect and graphically integrate city/building sensor data to enable greater efficiency in management of the cities/buildings and provide additional digital services. The present disclosure may be utilized for smart retail to collect and graphically integrate customer/backend sensor data to enable context-specific customer views and enable better cross-selling, promotions, and other customer-facing services. The present disclosure may be utilized for intelligent manufacturing industrial companies to collect and graphically integrate machine/robot sensor data to enable optimization of manufacturing processes and reduce costs, such as by providing recommendations on scrapping parts early or predictive maintenance to replace machine parts before they break. The present disclosure may be utilized to provide digital services and subscriptions to customers. Other implementations of the present disclosure are contemplated.

Figure 3A:
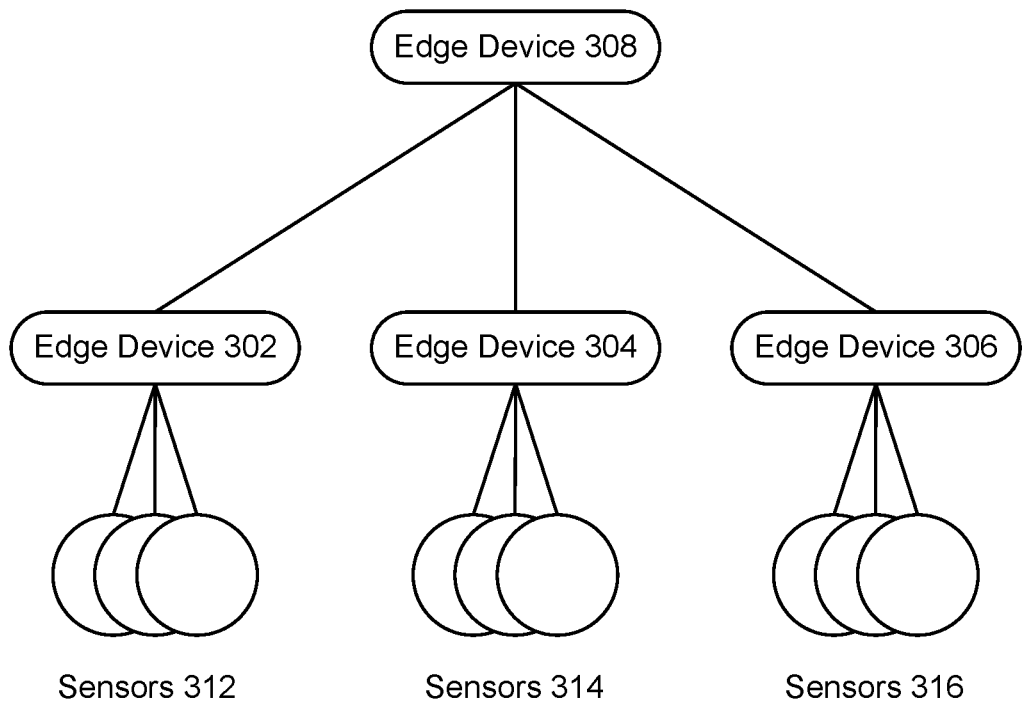
FIG. 3A illustrates an example diagram of edge devices and sensors.

FIG. 3A illustrates an example diagram of edge devices 302, 304, 306, 308 and sensors 312, 314, 316. The sensors 312, 314, 316 may be configured to make sensor observations. An edge device may be connected to one or more sensors and/or one or more other edge devices. The edge device 302 may be connected to the sensors 312, the edge device 304 may be connected to the sensors 314, and the edge device 306 may be connected to the sensors 316. An edge device may be connected to other edge device(s) for aggregation/analysis of sensor data. The edge device 308 may be connected to the edge devices 302, 304, 406.

An individual edge device may generate an edge device node for itself and sensor nodes for the sensors connected to the edge device. The edge device 302 may generate an edge device node for the edge device 302 and sensor nodes for the sensors 312. The sensor nodes for the sensors 312 may be connected to the edge device node for the edge device 302. The edge device 304 may generate an edge device node for the edge device 304 and sensor nodes for the sensors 314. The sensor nodes for the sensors 314 may be connected to the edge device node for the edge device 304. The edge device 306 may generate an edge device node for the edge device 306 and sensor nodes for the sensors 316. The sensor nodes for the sensors 316 may be connected to the edge device node for the edge device 306.

Individual edge devices may receive the sensor observations made by the connected sensors and populate the corresponding sensor nodes based on the received sensor observations. The edge device 302 may receive sensor observations made by the sensors 312 and populate the corresponding sensor nodes based on the received sensor observations. The edge device 304 may receive sensor observations made by the sensors 314 and populate the corresponding sensor nodes based on the received sensor observations. The edge device 306 may receive sensor observations made by the sensors 316 and populate the corresponding sensor nodes based on the received sensor observations.

The sensor nodes for the sensors may be locally managed by the edge devices to which the sensors are connected. The sensor nodes for the sensors 312 may be locally managed (e.g., generated, populated, updated, maintained, provide access to) by the edge device 302, the sensor nodes for the sensors 314 may be locally managed by the edge device 304, and the sensor nodes for the sensors 316 may be locally managed by the edge device 306. One or more devices (e.g., sensors, edge devices) may be remotely managed via connection to the cloud.

Multiple nodes generated by the edge devices may form a structured graph. Nodes generated by an edge device may be connected together to form a structured graph. Nodes generated by multiple edge devices may be connected together to form a structured graph. Nodes generated by multiple edge devices may be connected through connections between edge device nodes. Additional data sources may be connected to form a structured graph. The structured graph may be a model of the sensor observations made by the sensors. The structured graph may represent the sensor observations made by the sensors. Graph queries on the structured graph may be used to generate responses to sensor queries.

Graph queries may be directed (e.g., referenced) to one or more edge devices to generate responses to sensor queries. A graph query may be directed to one or more edge devices based on the sensor data that are needed to answer the sensor query. An edge device may have access to sensor data for the sensors connected to the edge device. An edge device may access sensor data by accessing sensor nodes of the sensors connected to the edge device. For example, the edge device 302 may have access to sensor data for the sensors 312, the edge device 304 may have access to sensor data for the sensors 314, and the edge device 306 may have access to sensor data for the sensors 316. A query for a specific sensor may be made on the edge device connected to the sensor. For example, a query for one or more of the sensors 312 may be made on the edge device 302, a query for one or more of the sensors 314 may be made on the edge device 304, and a query for one or more of the sensors 316 may be made on the edge device 306.

An edge device may have access to sensor data for the sensors connected to other edge device(s). An edge device may have access through connection with the other edge device(s). For example, the edge device 308 may have access to the sensor data for the sensors 312 (through the edge device 302), the sensor data for the sensors 314 (through the edge device 304), and the sensor data for the sensors 316 (through the edge device 306). A query for one or more of the sensors 312, 314, 316 may be made on the edge device 308. The hierarchy of edge devices may enable flexibility in which edge devices are queried. For example, a query for the sensors 312, 314 may be made on the edge devices 302, 304 or the edge device 308.

Figure 3B:
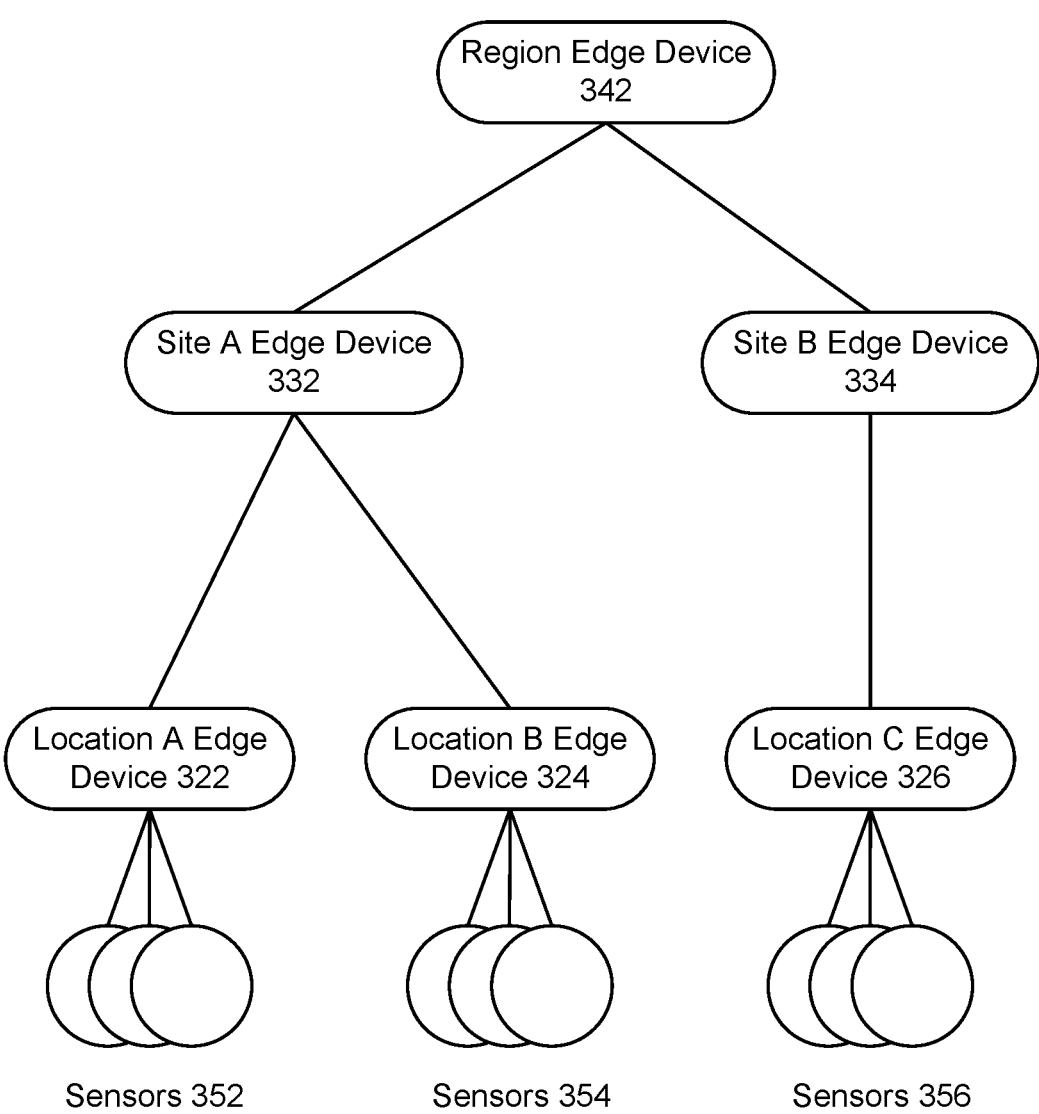
FIG. 3B illustrates an example diagram of edge devices and sensors.

FIG. 3B illustrates an example diagram of edge devices and sensors. Different edge devices may be deployed in different locations. Different edge devices may be located in different locations to locally manage the sensor nodes for the sensors deployed in the different locations. Sensor nodes in different locations may be aggregated through one or more edge devices. A hierarchy of edge devices may be used to generate a hierarchy of sensor nodes/edge device nodes.

For example, a location A edge device 322, a location B edge device 324, and a location C edge device 326 may be deployed in different locations. The location A edge device 322 may be connected to sensors 352 and may locally manage sensor nodes for the sensors 352. The location B edge device 324 may be connected to sensors 354 and may locally manage sensor nodes for the sensors 354. The location C edge device 326 may be connected to sensors 356 and may locally manage sensor nodes for the sensors 356.

The location A edge device 322 and the location B edge device 324 may be deployed in one site, and the location C edge device 326 may be deployed in another site. Site edge devices may be deployed in different sites to aggregate/analyze sensor data/sensor nodes for the sensors in different locations in the sites. For example, a site A edge device 332 may be deployed in one site to aggregate/analyze sensor data/sensor nodes for the sensors in the one site and a site B edge device 334 may be deployed in another site to aggregate/analyze sensor data/sensor nodes for the sensors in the other site. The site A edge device 332 may be connected to the location A edge device 322 and the location B edge device 324. The site B edge device 334 may be connected to the location C edge device 326.

The site A edge device 332 and the site B edge device 334 may be deployed in one region. Region edge devices may be deployed in different regions to aggregate/analyze sensor data/sensor nodes for the sensors in different locations in the regions. For example, a region edge device 342 may be deployed in a region to aggregate/analyze sensor data/sensor nodes for the sensors in the region. The region edge device 342 may be connected to the site A edge device 332 and the site B edge device. Other hierarchies of locations are contemplated.

Figure 4:
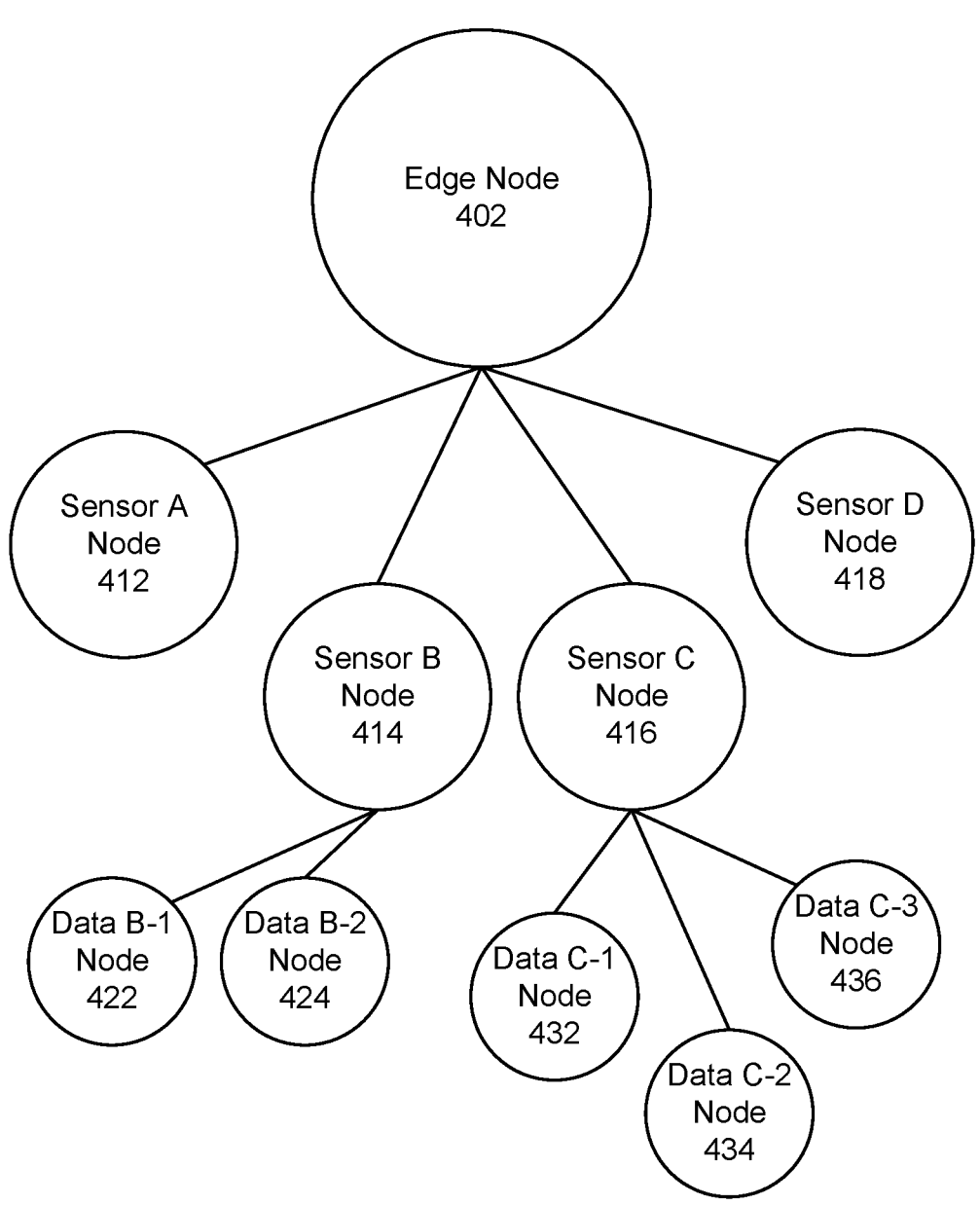
FIG. 4 illustrates an example graph including an edge node, sensor nodes, and data nodes.

FIG. 4 illustrates an example graph including an edge node, sensor nodes, and data nodes. An edge node 402 may represent an edge device in a location. A sensor A node 412, a sensor B node 414, a sensor C node 416, and a sensor D node 418 may represent four sensors (sensors A, B, C, D) connected to the edge device. The sensor A node 412, a sensor B node 414, a sensor C node 416, and a sensor D node 418 may be connected to the edge node 402. A sensor node may be connected to one or more data nodes. Sensor data may be populated in the data node(s) of a sensor node. For example, the sensor B node 414 may be connected to a data B-1 node 422 and a data B-2 node 424. The sensor C node 416 may be connected to a data C-1 node 432, a data C-2 node 434, and a data C-3 node 436. The number and types of data nodes generated and connected to sensor nodes may depend on the types of the sensors. A graph schema may define different numbers and/or different types of data nodes for different types of sensors.

Figure 5:
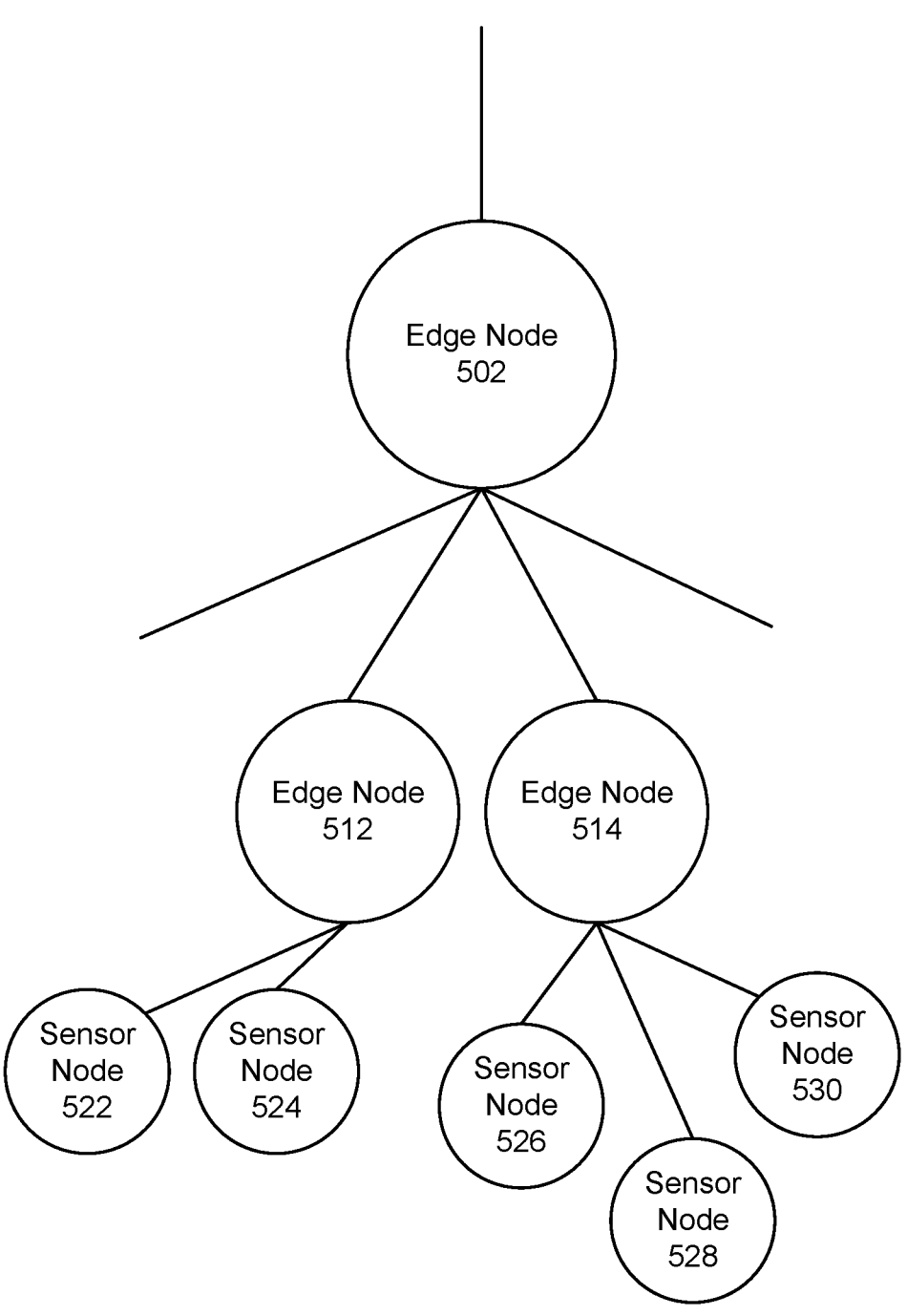
FIG. 5 illustrates an example graph including edge nodes and sensor nodes.

FIG. 5 illustrates an example graph including edge nodes and sensor nodes. An edge node 502 may represent an edge device for a site. An edge node 512 and an edge node 514 may represent two other edge devices at different locations in the site. The two other edge devices at different locations in the site may be connected to the edge device for the site. The edge node 502 may be connected to the edge node 512 and the edge node 514. The edge node 502 may be connected to other edge nodes (representing other edge devices in the site, representing an edge device in a region).

A sensor node 522 and a sensor node 524 may represent two sensors connected to the edge device represented by the edge node 512. The sensor node 522 and the sensor node 524 may be connected to the edge node 512. A sensor node 526, a sensor node 528, and a sensor node 530 may represent three sensors connected to the edge device represented by the edge node 514. The sensor node 526, the sensor node 528, and the sensor node 530 may be connected to the edge node 514.

Referring back to FIG. 1, the sensor(s) 15 may include one or more sensors. The sensor(s) may include multiple sensors of the same type. The sensor(s) may include multiple sensors of different types. A sensor may refer to a device that measures (e.g., ascertains, detects, estimates, quantifies) one or more properties. A sensor may be configured to measure one or more properties of a thing (a living thing, a non-living thing, an object, a vehicle, a piece of equipment, a structure, a region) and/or an environment around the thing. A sensor may refer to a device that converts the measured properties into one or more electrical signals. The electrical signal(s) may convey information that defines the measured propert (ies). A sensor may include one or more of an analog sensor, a digital sensor, a passive sensor, an active sensor, a remote sensor, a contact sensor, a discrete sensor, a continuous sensor, a fixed sensor, a mobile sensor, and/or other sensor. Example types of sensors include image sensor, sound sensor, temperature sensor, pressure sensor, flowrate sensor, valve position sensor, distributed fiber optic sensor, polymer absorption cable or sensor, acoustic emissions sensor, hydrocarbon isotope sensor, and point sensor. Other types of sensors are contemplated.

For implementations with respect to oil/gas assets, the sensor(s) may include one or more sensors installed on one or more oil/gas assets. The sensor(s) may include one or more sensors installed in one or more facilities that operate or monitor oil/gas assets. The sensor(s) may include one or more sensors installed on one or more pieces of equipment that operate oil/gas assets. The sensor(s) may include one or more sensors installed in one or more regions where oil/gas assets are located. The sensor(s) may include one or more distributed sensors. The sensor(s) may include one or more point sensors. The sensor(s) may include one or more intrusive sensors (i.e., penetrate pipe/equipment) and/or one or more nonintrusive sensors (i.e., do not penetrate pipe/equipment).

The sensor(s) may be configured to make one or more sensor observations. A sensor observation may refer to a result of a measurement made by a sensor. A sensor observation may include information that is sensed (e.g., measured, detected, estimated, quantified) by a sensor. A sensor observation may be made at a specific time and/or for a specific duration. A sensor observation may be made periodically. A sensor observation may be made in response to a specific event. A sensor observation may be made in response to a specific command. A sensor observation may include information on one or more results from analytics performed by a sensor on the measurement(s) made by the sensor.

A sensor may be deployed in a location to measure propert(ies) in the location. Properties measured by a sensor and/or results of analysis performed on the properties measured by a sensor may be referred to as sensor observations. Sensor observations may include status/condition of a thing determined by a sensor, the probability (confidence) of the status/condition of the thing determined by the sensor, and/or other information relating to the thing. Sensor observations may include the measured propert(ies) and other information associated with the measured propert(ies), such as what, when, where, and/or why the propert(ies) were measured. Sensor observations may include properties/information derived from measured properties, either in real-time or over time. Sensor observations may include information relating to operation of a sensor, such as information on the sensor's self-diagnostics relating to measurement quality. Other types of sensor observations are contemplated.

One or more sensors may be connected to an edge device. An edge device may be connected to one or more other edge devices. An edge device may be connected to other computing devices. Connection between an edge device and other devices (e.g., sensors, edge devices, computing devices making sensor queries) may be defined by device identifiers (e.g., sensor identifier, edge device identifier, computing device identifier), port numbers, IP addresses, and/or other information relating to the connection between the edge device and other devices.

The sensor observations made by the sensor(s) may be received by one or more edge devices (e.g., processor(s)). An edge device may receive the sensor observations from the sensor(s) through connections between the edge device and the sensor(s). An edge device may receive the sensor observations from the sensor(s) in real-time, near real-time, or with a delay. An edge device may receive the sensor observations from the sensor(s) individually or in a batch. An edge device may receive individual pieces of data (e.g., measurement at a moment in time) or batches of data from a single sensor (e.g., measurements aggregated over time).

An edge device may refer to a computing device that controls data flow at the boundary between two or more networks. An edge device may refer to a computing device that provides an entry point into one or more networks. An edge device may serve as a data processing point at the edge of one or more networks. An edge device may refer to a computing device that collects information from the sensor (s) connected to the edge device. An edge device may enable transfer of information from sensor observations made by the sensors to other computing devices (e.g., other edge devices, computing devices making sensor queries, the cloud). An edge device may be deployed in a location to collect sensor observations made by the sensors at the location. An edge device may generate information by performing analyses on the received data (e.g., data received from sensor(s), data received from other computing devices). An edge device may be associated with the location of deployment.

An edge device may include a computing device, such as an industrial gateway or a programmable logic controller. An edge device may collect sensor data (e.g., sensor observations) from sensors and make the collected sensor data available for use by another computing device (e.g., another edge device, remote computing device). For example, an edge device may be configured to collect sensor data from sensors deployed in a location, generate a structured graph (including an edge device node for the edge device and sensor nodes for the sensors, with the sensor nodes connected to the edge device node), populate the sensor nodes using the collected sensor data, and provide the structured graph to a computing device making a sensor query. Nodes generated by multiple edge devices may be combined together within a single structured graph. For implementations that include sensors/edge devices connected to the cloud, nodes generated in the cloud may be combined together within a structured graph. Nodes generated in the cloud may be combined with nodes generated by one or more edge devices within a structured graph.

An edge device may be configured to communicate with other devices (e.g., sensors, edge devices, computing devices making sensor queries) using one or more communication protocols. For example, an edge device may communicate with connected sensors using ModBus, BACnet, CANbus, IEC 60870, TCP/IP, streaming, and/or other communication protocols. An edge device may communicate with other devices using the same or different communication protocols. For example, an edge device may communicate with other edge devices using MQTT (Message Queuing Telemetry Transport), a lightweight messaging protocol that is well-suited for use in IoT applications. An edge device may communicate with human machine interface using RESTful API, graphQL, and/or other communication protocols. An edge device may communicate with the cloud using MQTT, FTP, streaming, and/or other communication protocols. Usage of other communication protocols/ other combinations of communication protocols is contemplated.

An edge device may make sensor observations made by the connected sensors available to other computing devices in the form of a structured graph. The structured graph may include nodes representing sensors, edge devices, sensor observations, and connections between them. The structured graph may represent the topology and/or configuration of the sensor(s) and the edge device. One or more functionalities of the edge device may be implemented in the cloud, with the structured graph including nodes representing the sensors, the cloud, the sensor observations, and the connections between them and the structured graph representing the topology of the sensor(s) and/or configuration of the sensor(s) and the cloud. The cloud may provide different types of information than those obtained from sensor observations. For example, the cloud may provide information on sensor specifications, equipment specifications, and/or maintenance (e.g., equipment/sensor repair and/or replacement records). Such types of data/information may be represented by nodes and connected to the structured graph to expand the capabilities of the structured graph to answer sensor queries.

The structured graph may provide a graphical representation of the sensor data. The structured graph may be used to answer sensor queries. The structured graph may be used to analyze the sensor data. The structured graph may be used to visualize the sensor data structure. The structured graph may be used to predict future sensor observations.

The structured graph may have a predefined node and connection structure based on the sensors deployed at the location of the edge device. An edge device may obtain the sensor observations made by the connected sensors, parse out the sensor observations, and assign the relevant information from the sensor observations to the nodes in the structured graph. The structured graph may be made available to other computing devices. For example, one or more computing devices may subscribe to a node and receive updates when changes are made to the node. One or more computing devices may query the data contained within the structured graph using a graph API. Other usage of the structured graph is contemplated.

Such aggregation and distribution of sensor observations by an edge device enables sensor observations to be used by any computing device, including the edge device. Such aggregation and distribution of sensor observations by an edge device enables sensor observations to be shared using one or more communication protocols. Such aggregation and distribution of sensor observations by an edge device reduces the amount of information that needs to be transmitted for sensor queries. For example, rather than transmitting all information collected from the connected sensors, an edge device may transmit information associated with/included within particular nodes of the structured graph.

An edge device may include the processor 11 and/or other components. The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate graphically integrating sensor data through edge devices. The machine-readable instructions 100 may include one or more computer program components. The machine-readable instructions 100 may include one or more of a graph component 102, an observation component 104, a population component 106, and/or other computer program components. Performance of an operation by a component of an edge device may include performance of the operation by the edge device, and vice versa.

The graph component 102 of an edge device may be configured to generate one or more nodes for a structured graph. A structured graph may refer to a graph/model that represents sensor observations made by sensors and edge devices connected to the sensors making the sensor observations using nodes and connections (links/lines) between the nodes. A structured graph may include a representation of nodes (data) with links/lines (relationship, connectivity).

The graph component 102 of an edge device may be configured to generate an edge device node for the edge device and a set of sensor nodes (one or more sensor nodes) for a set of sensors (one or more sensors) connected to the edge device. The sensor nodes(s) for the sensor(s) connected to an edge device may be locally generated and managed by the edge device. The set of sensor nodes may be connected to the edge device node. Connections between the sensors and the edge device may be represented by links/lines between the corresponding nodes. Different edge devices may locally generate and manage different sets of sensor nodes for different sets of sensors connected to the different edge devices.

The structure of the structured graph may depend on sensors/types of sensors deployed at different locations, edge devices deployed at the different locations, connections between the sensors and the edge devices, and connections between the edge devices. The structure of the structured graph may include the number of nodes, the types of nodes, and/or the connections between the nodes in the structured graph. A node may be defined by/associated with information relating to the represented edge device/sensor. For example, a node may be defined by/associated with the identifier of the edge device/sensor, the port number of the edge device/sensor, the IP address of the edge device/sensor, the location of the edge device, sensor output from the sensor, and/or other information. Information defining/associated with a node may be stored/represented within one or more other nodes (sub-nodes) connected to the node. For example, the identifier of the edge device/sensor may be stored/represented within an identifier node connected to the edge device node/sensor node.

The structured graph may include static connections between the nodes and/or dynamic connections between the nodes. Connections between the nodes may be established based on data, spatial, temporal, and/or relationship connections between the nodes. Connection between the nodes may enable sensor queries to be answered. For example, connections between an edge device node for an edge device at a location and sensor nodes for sensors connected to the edge device at the location may enable a sensor query to retrieve all sensor data from the location by retrieving information contained within sensor nodes connected to the edge device node for the location.

In some implementations, a sensor node for a sensor may be connected to one or more data nodes. A data node may store/represent one or more pieces of data for the sensor.

Data node(s) may be generated for a sensor node based on the type of the sensor represented by the sensor node. Different data nodes may be generated for different types of sensors. Different data nodes may be generated and connected to a sensor node for different types of data associated with the sensor. For example, different data nodes may be generated and connected to sensor nodes for an image sensor and a temperature sensor to store/represent different types of output provided by the image sensor and the temperature sensor.

The observation component 104 of an edge device may be configured to receive the sensor observations made by the sensor(s) connected to the edge device. Receiving a sensor observation may include one or more of accessing, acquiring, analyzing, determining, examining, identifying, loading, locating, obtaining, opening, retrieving, reviewing, selecting, storing, and/or otherwise receiving the sensor observation. A sensor observation made by a sensor may be received directly or indirectly from the sensor. Sensor observations made by different sets of sensors may be received by the observation component 104 of different edge devices connected to the different sets of sensors.

In some implementations, sensor observations made by a sensor may be transmitted by the sensor to a message broker. For example, sensor observations made by a sensor may be included within a JSON message/packet using MQTT communication protocol. The edge device may listen to the MQTT topics (strings to identify and route messages). When a new message arrives from a sensor connected to the edge device, the edge device may parse the message and use the data contained within the message to populate the corresponding sensor node (data nodes connected to the corresponding sensor node).

A message from a sensor may include the sensor observation made by the sensor, information relating to the sensor, information relating to the sensor observation, and/or other information. For example, a message from a sensor may include the identifier of the sensor, the identifier of the recipient edge device, the location of the sensor/edge device (e.g., facility name, site name, region name, longitude and latitude), timing of the sensor observation (e.g., event occurrence time, event received time), identifier of the sensor observation (e.g., event identifier, event description), type of the sensor observation (e.g., temperature measurement, pressure measurement, flowrate measurement, valve status, image, video, audio), data from the sensor observation (e.g., measured temperature, measured pressure, measured flowrate, value closed/opened, link to/location of an image file, link to/location of a video file, link to/location of an audio file), analysis from the sensor observation (e.g., leak detection, leak location, error status, error location, alert, alert location), probability of the sensor observation (e.g., leak detection confidence, error status confidence, alert confidence), and/or other information.

In some implementations, one or more nodes and/or one or more connections between the nodes of the structured graph may be generated by an edge device based on the sensor observations received from the connected sensors. For example, a message from a sensor connected to an edge device may include information on the edge device to which the sensor is connected and the location (e.g., site, region) in which the sensor is located. The nodes for the sensor, the edge device, and the locations may be automatically generated and/or connected based on the information contained within the message from the sensor. For example, a region node, a site node, an edge device node, and/or the sensor node may be generated. The region node may be connected to the site node, the site node may be connected to the edge device node, and the edge device node may be connected to the sensor node.

The message from a sensor connected to an edge device may include information on the sensor observation made by the sensor, such as type of the sensor, the identifier of the sensor, the time of the sensor observation, the value of the sensor observation, the confidence level of the sensor observation, the analysis from the sensor observation, and/or other information. The sub-nodes for the sensor node may be automatically generated and/or connected based on the information contained within the message from the sensor. For example, a type node, an identifier node, a time node, a value node, a confidence level node, an analysis node, and/or other nodes may be generated. The sub-nodes may be connected to the sensor node.

The population component 106 of an edge device may be configured to automatically populate the connected sensor node(s) based on the sensor observations made by the sensor(s) connected to the edge device. Populating a sensor node based on a sensor observation made by a sensor connected to an edge device may include adding/including data/information in the sensor node, updating/modifying data/information in the sensor node, and/or otherwise populating the sensor node based on the sensor observation. A sensor node may be populated with information from the sensor observation and/or information determined from the sensor observation. Different edge devices may populate the sensor nodes for the sensors connected to the different edge devices.

For example, when a sensor observation made by a sensor is received by the edge device (e.g., in the form of a JSON message/packet using MQTT communication protocol), the population component 106 of the edge device may automatically parse the received sensor observation to extract the information to be populated within the corresponding sensor node. The population component 106 of the edge device may utilize the information extracted from the received sensor observation to perform analysis and populate the corresponding sensor node with the results of the sensor observation analysis.

In some implementations, population of a sensor node based on a sensor observation made by a sensor may include population of the data node(s) connected to the sensor node based on the sensor observation made by the sensor. Different types of information extracted/determined from the sensor observation may be populated within different types of data nodes connected to the sensor node. For example, temperature value in the sensor observation may be populated in a temperature sub-node of the sensor node.

In some implementations, one or more nodes may be generated by an edge device for population by the population component 106. For example, a sensor node may be generated based on a message being received from a new sensor and/or a sub-node for a sensor node may be generated based on a message including a new type of data in a sensor observation.

A sensor node may be repopulated by the connected edge device responsive to reception, by the connected edge device, of a new sensor observation made by the sensor. The edge device may update the sensor node (e.g., data nodes of the sensor node) whenever a new sensor observation is received by the edge device.

In some implementations, different sensor nodes may be locally managed by the connected edge devices. A set of sensor nodes for sensor(s) connected to an edge device may be locally managed by the edge device and another set of sensor nodes for sensor(s) connected to another edge device may be locally managed by the other edge device. Local management of sensor nodes by an edge device may include generation of the sensor nodes, generation of connections of the sensor nodes, and population of the sensor nodes by the edge device. Rather than having a single device be responsible for management of sensor nodes in different locations, edge devices at various locations may be used to locally manage the local sensor nodes.

The nodes managed by edge devices may form a structured graph. The edge device nodes, the sensor nodes, and/or other nodes may form a structured graph. The edge device nodes and sensor nodes managed by different edge devices may form a structured graph. The structured graph may be provided to one or more computing devices (e.g., other edge devices, computing devices making sensor queries). Providing a structured graph to a computing device may include giving access to, making available, sending, transmitting, and/or otherwise providing the structured graph to the computing device.

Information populated within the sensor nodes may be available using one or more graph APIs (e.g., Gremlin, graphQL, etc.). For example, an edge device may maintain an aggregation of nodes and connections generated from the available sensor data and relationships between the sensors/sensor data. The structured graph may be made available to computing device(s) using a graph API specification (e.g., gremlin, graphQL, etc.). In some implementations, the structured graph may be provided to computing device(s) using MQTT protocol and/or other communication protocol(s). MQTT protocol may be compatible with IoT applications and use of the MQTT protocol may enable the structured graph to be used by IoT applications. Use of other communication protocols is contemplated. For example, MQTT protocol and/or other traditional IoT interfaces may be used to send data from devices/sensors to the edge devices. The edge devices may generate a structured graph representing the sensors, data, and connections between the sensors/devices. The structured graph may make the sensor data available via a graph API specification (e.g., gremlin, graphQL, etc.). The advantage of this approach is that it generalizes complex relationship/connections between different sensors and makes sensor data from different types of sensors and sensor data connected to different devices generally available via a graph query.

Information populated within the sensor nodes may be obtained through the connected edge device. For example, a sensor A may be connected to an edge device A and a sensor B may be connected to an edge device B. Information populated within a sensor A node may be obtained through a query on the edge device A while information populated within a sensor B node may be obtained through a query on the edge device B. Information populated within the sensor nodes may be obtained through a higher-level edge device. For example, the edge device A (for location A) and the edge device B (for location B) may be connected to an edge device C (for the site including the location A and the location B). Information populated within the sensor A node and the sensor B node may be obtained through queries on the edge devices A and B or a query on the edge device C.

A sensor query may be made by a computing device. A sensor query may be made by an edge device, a computing device connected to an edge device, and/or other devices. A computing device connected to an edge device may include a device that is remote from the edge device. For example, a computing device may be connected to the edge device over a network to make sensor queries. A sensor query may be directed to one or more edge devices. A sensor query may be directed to a particular edge device based on information being sought from the sensor(s) connected to the particular edge device. A sensor query may be directed to a particular edge device based on the particular edge device being connected to the edge device(s) which are connected to the sensor(s) from which information is sought.

A sensor query may refer to a question or a request relating to sensor(s)/sensor observation(s). A sensor query may refer to a question or a request for information relating to sensor(s)/sensor observation(s). A sensor query may be made by a computing device manually based on user input, such as based on a user inputting the sensor query into the computing device. A sensor query may be made by a computing device automatically, such as based on occurrence of one or more events, passage of time, and/or other information. A sensor query may be made to answer questions/obtain information about the sensor(s), the sensor observation(s), physical thing(s)/objects monitored by the sensor(s), and/or action(s) monitored by the sensor(s).

Generation of the structured graph that represents sensor observations and relationships between sensors/edge devices may enable sensor data and relationship data represented by the graph structure to be easily and quickly accessed to answer sensor queries. Generation of the structured graph that represents sensor observations and relationships between sensors/edge devices may enable stranded sensor data to be accessed by remote devices.

One or more responses to a sensor query may be generated based on one or more graph queries on the structured graph and/or other information. A graph query may utilize connections between nodes of the structured graph and/or information contained within the nodes to generate response(s) to the sensor query. A graph query may traverse the structured graph to obtain information from different nodes. The obtained information may be used to generate the response(s) to the sensor query.

For example, a graph query may be used to pull information from specific nodes (e.g., pull values of measured properties; pull confidence of measured properties). A graph query may be used to pull information from multiple nodes. A graph query may be used to pull information from node(s) that meet one or more criteria. A graph query may be used to filter the structured graph, rank the nodes, and/or otherwise manipulate the structured graph. A graph query may be used to determine when certain conditions are detected by the sensor(s). A graph query may combine multiple structured graphs within a single query. FIG. 6A illustrates example graph queries that may be used on the structured graph to identify sensors/sensor data that satisfy one or more criteria. FIG. 6B illustrates an example graph query to identify changes in data trends by querying for a specific attribute over different time periods. This graph query may (1) identify a device with a specified name, (2) filter timestamps to the desired time periods, (3) calculate the mean flowrate for individual time periods, and (4) select the average values for the current and previous week. FIG. 6C illustrates an example graph query to find the top devices with the highest average flowrate change percentage within the last month, grouped by region. This graph query may start with the region node and traverse through the site node, edge_device node, and device_name node. The timestamps may be filtered to only the last month's data. The graph query may group the average flowrate values and limit the results to the top three devices. The graph query may return the top devices in each region. Other uses of graph queries to access information from the structured graph are contemplated.

The structured graph of the present disclosure may be compatible with other types of graphs. Multiple graphs may be combined based on graph endpoints and crossing of reference nodes. For example, engineering documents may be available with Gremlin API or Microsoft Graph API. Different graphs may be queried for different types of information (e.g., engineering documents, sensor data related to a particular site), and the results may be joined. This compatibility with other graphs may expand the querying capabilities of the structured graph. FIG. 7A illustrates an example graph query on a sensor data graph to obtain the desired sensor information. FIG. 7B illustrates an example graph query on an engineering documents graph to obtain engineering documents associated with the desired site. FIG. 7C illustrates an example code to merge the results.

In some implementations, a sensor query may include a relationship query. A relationship query may refer to a sensor query in which connections between sensor nodes are dynamically generated based on the relationship query. Two or more unconnected sensor nodes in the structured graph may be dynamically connected based on the relationship query and/or other information. The sensor nodes in the structured graph may be dynamically connected based on one or more criteria in the relationship query and/or other information. The response(s) to the sensor query may be generated based on the dynamic connections in the structured graph. The flexibility of the graph structure may enable connections between the nodes to be generated as needed to answer the relationship query.

Dynamic connections between the nodes may be generated based on one or more relationship calculations. For example, a graph query may generate dynamic connections based on similarity of device names. For instance, an embedding model may be applied to device names to identify devices with names that are similar by a certain amount (e.g., 90% similar). Such a graph query may be useful when applied to text (e.g., names, description) with different naming conventions for the same device in different domains (e.g., engineering requirement documents versus Supervisory Control and Data Acquisition references). The structured graph may include static connections between edge device nodes and sensor nodes based on connections between the edge devices and the sensors. The structured graph may be modified by dynamically generating connections between sensor nodes or between sensor nodes and other nodes (such as an engineering requirements node for the sensor(s)) based on similarity of device names.

FIG. 8A illustrates an example code to generate embeddings for device names using the Sentence Bert model and store them as a new property in the device nodes. FIG. 8B illustrates an example code to calculate similarity scores for the device names, such as values of cosine similarity between the embeddings of different pairs of devices, and generate a new connection for two nodes if the names of the corresponding devices are sufficiently similar (e.g., above 90% similarity threshold). With the structured graph modified to include new connections based on the name-similarity relationship, FIG. 8C illustrates an example graph query to identify devices with similar names and identify edge devices connected to devices with similar names. Other relationship calculations may be used to dynamically generate connections between nodes and enable graph queries to be answered based on the dynamic relationships.

In some implementations, different edge devices may be in different locations. Different location nodes may be generated for different locations of edge devices, and the edge device nodes for the edge devices may be connected to the location nodes corresponding to the locations in which they are located. The location nodes may represent an edge device for a particular location. The edge device for a particular location may serve as a common edge device to connect the edge devices in the same location. The common edge devices may be connected to the edge devices in the same location. The common edge devices may be configured with information on the edge devices (e.g., device identifier, device IP) in the corresponding locations.

For example, different edge devices may be located in different locations within a site. The edge devices located in the same site may be connected to a common edge device for the site. The common edge device may be configured with the identifiers and/or the IP addresses of the edge devices in the site. The site may be represented by a site node, and the edge device nodes corresponding to the edge devices at different locations in the site may be connected to the site node. Multiple levels of location hierarchies (e.g., locations, sites, regions, etc.) may be used to provide distribution of sensors/sensor nodes and aggregation of sensors/sensor nodes to generate responses to sensor queries.

The edge devices (and connected sensors) may be located at different places to provide distributed sensing capabilities. For example, the edge devices and the sensors may be located at different parts of an oil/gas asset. An oil/gas asset may include an upstream asset, a midstream asset, a downstream asset, and/or other asset. An upstream asset may include an asset related to exploration and production of oil and/or gas, such as reserves, drilling rigs, and production facilities (e.g., oil wells, gas fields). A midstream asset may include an asset related to the transportation and storage of crude oil, natural gas, and refined products, such as pipelines, pumps/compressors, storage tanks, and transportation vessels. A downstream asset may include an asset related to the refining of crude oil, the purifying of natural gas, and the distribution of products derived from crude oil and natural gas, such as refineries and retail outlets.

The structured graph may be used to monitor the conditions of one or more assets. For example, a response to a sensor query may include one or more conditions in different parts of the oil/gas asset. The structured graph may be used to facilitate operations at one or more assets (e.g., automatic operations of equipment at the asset(s)). Facilitating an operation at an asset may include enabling/assisting in preparation, planning, and/or performance of the operation at the asset. Facilitating an operation at an asset may include automatically selecting and/or performing the operation at the asset. For example, one or more operations may be performed at the oil/gas asset based on the condition(s) in different parts of the oil/gas asset, such as determined from sensor quer(ies), and/or other information. One or more particular operations may be automatically selected and/or performed responsive to the conditions in the oil/gas asset satisfying one or more criteria. For instance, responsive to the conditions in the oil/gas asset satisfying one or more criteria, automatic shutdown or start-up of equipment may be performed and/or an automated call-out of repair personnel may be made. Responsive to the conditions in the oil/gas asset satisfying one or more criteria, an automated modification of operating parameters of the oil/gas asset may be performed and/or a notification may be provided to personnel who would then modify the operation of the oil/gas asset in response.

For example, the structured graph may be used to monitor the conditions of an oil pipeline. Sensors placed at various locations along the pipeline may be connected to edge devices. The edge devices may generate and populate sensor nodes that represent the data collected by these sensors. For example, this data may include information about temperature, pressure, and flow rate within the pipeline. If the structured graph indicates an abnormal condition, such as a sudden drop in pressure or an increase in temperature, this could signal a potential leak in the pipeline. The detection of the abnormal condition may automatically trigger a response, such as shutting down the section of the pipeline where the abnormal condition was detected and/or alerting maintenance personnel to inspect and repair the potential leak. Such use of the structured graph may facilitate prevention of oil spills and minimization of environmental damage.

As another example, the structured graph may be used in a refinery setting. Sensors placed on various pieces of equipment, such as distillation columns, heat exchangers, and pumps, may measure variables such as temperature, pressure, and vibration. The data from these sensors may be collected by edge devices and used to monitor the condition of the equipment and predict potential failures. For example, an increase in vibration on a pump may indicate a potential failure. The structured graph, by integrating this sensor data, may be used to detect this abnormal condition and trigger a response, such as alerting maintenance personnel, who could inspect and repair the pump before it fails, thus avoiding a shutdown of the refinery. These examples illustrate how the structured graph, by graphically integrating sensor data through edge devices, can facilitate operations in an oil/gas asset by enabling automatic responses to conditions detected by sensors. This can result in improved operational efficiency and safety. Other selection and performance of operations using the structured graph are contemplated.

FIG. 9 illustrates example graph queries 910, 920, 930, 940, 950 that may be used in the context of an oil/gas asset. The query 910 may be used to find all sensors of a specific type. The query 910 may returns all nodes (sensors) that have a property 'type' with a value of 'temperature.' The query 920 may be used to find the latest reading of a specific sensor. The query 920 may return the 'currentReading' property of the sensor with an ID of '1234·' The query 930 may be to find all sensors in a specific location. The query 930 may return all nodes (sensors) that have a property 'location' with a value of 'refineryA.' The query 940 may be used to find all sensors with an abnormal reading. The query 940 may return all nodes (sensors) that have a property 'status' with a value of 'abnormal.' The query 950 may be used to find all sensors that are connected to a specific edge device. The query 950 may return all nodes (sensors) that are connected to the edge device with an ID of '5678.' Other graph queries are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) computer-readable storage medium may include read-only memory, random access memory, magnetic disk storage media, optical storage media, flash memory devices, and others, and a machine-readable transmission medium may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, the electronic display 14, and the sensor(s) 15 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, the electronic display 14, and the sensor(s) 15 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
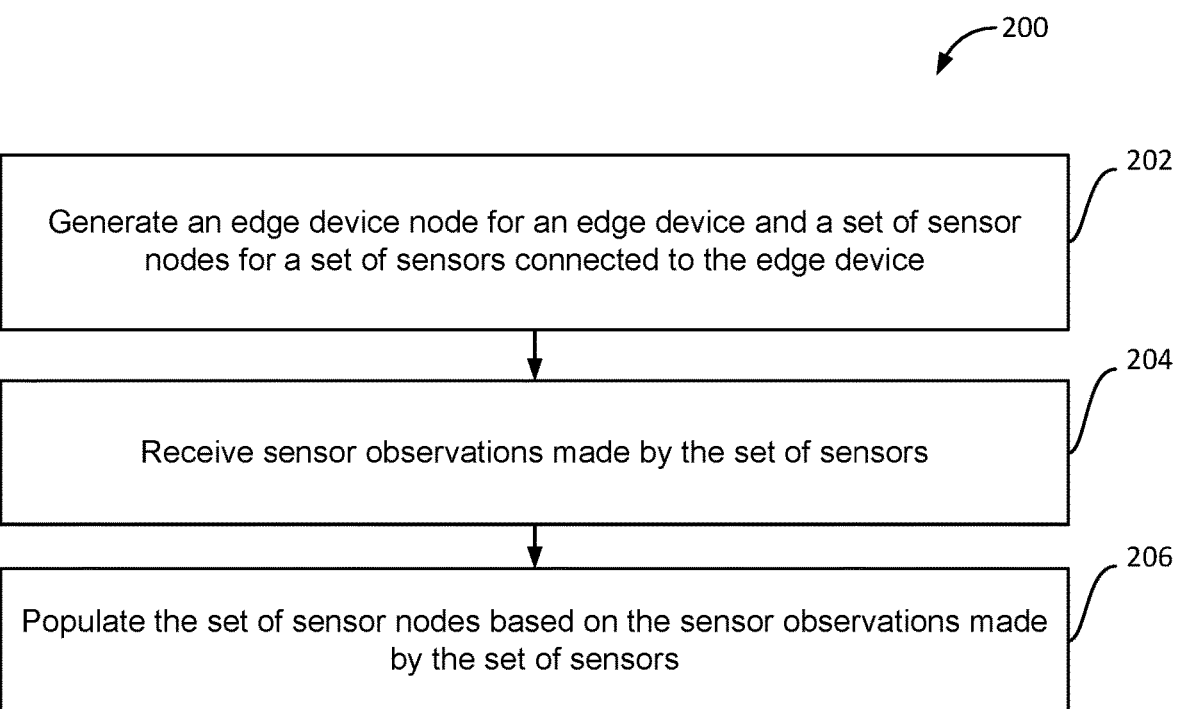
FIG. 2 illustrates an example method for graphically integrating sensor data.

FIG. 2 illustrates method 200 for graphically integrating sensor data. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, sensors may make sensor observations. An edge device may be connected to a set of sensors. Multiple edge devices may be connected to different sets of sensors.

At operation 202, an edge device node for an edge device and a set of sensor nodes for a set of sensors connected to the edge device may be generated. The set of sensor nodes may be connected to the edge device node. In some implementations, operation 202 may be performed by a processor component the same as or similar to the graph component 102 (Shown in FIG. 1 and described herein).

At operation 204, sensor observations made by the set of sensors may be received by the edge device connected to the set of sensors. In some implementations, operation 204 may be performed by a processor component the same as or similar to the observation component 104 (Shown in FIG. 1 and described herein).

At operation 206, the set of sensor nodes may be populated by the edge device based on the sensor observations made by the set of sensors. The edge device node, the set of sensor nodes, and/or other nodes may form a structured graph. A response to a sensor query may be generated based on one or more graph queries on the structured graph. In some implementations, operation 206 may be performed by a processor component the same as or similar to the population component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for graphically integrating stranded sensor data, the system comprising:
   a first set of sensors configured to make sensor observations for a first location of an oil/gas asset, the first set of sensors including at least a first sensor, the sensor observations made by the first set of sensors stranded at the first location;
   a second set of sensors configured to make sensor observations for a second location of the oil/gas asset, the second set of sensors including at least a second sensor, the sensor observations made by the second set of sensors stranded at the second location;
   a first edge device connected to the first set of sensors, the first edge device configured to locally manage the sensor observations made by the first set of sensors for the first location of the oil/gas asset by:
      generating a first edge device node for the first edge device and a first set of sensor nodes for the first set of sensors, wherein a first sensor node is generated for the first sensor, the first set of sensor nodes connected to the first edge device node;
      receiving the sensor observations made by the first set of sensors, wherein a first sensor observation made by the first sensor is received; and
      populating the first set of sensor nodes based on the sensor observations made by the first set of sensors, wherein the first sensor node is populated based on the first sensor observation made by the first sensor; and
   a second edge device connected to the second set of sensors, the second edge device configured to locally manage the sensor observations made by the second set of sensors for the second location of the oil/gas asset by:
      generating a second edge device node for the second edge device and a second set of sensor nodes for the second set of sensors, wherein a second sensor node is generated for the second sensor, the second set of sensor nodes connected to the second edge device node;

receiving the sensor observations made by the second set of sensors, wherein a second sensor observation made by the second sensor is received; and populating the second set of sensor nodes based on the sensor observations made by the second set of sensors, wherein the second sensor node is populated based on the second sensor observation made by the second sensor; wherein:

the first edge device node, the first set of sensor nodes, the second edge device node, and the second set of sensor nodes form a structured graph; and a condition of the oil/gas asset is monitored based on a graph query on the structured graph, wherein the condition of the oil/gas asset is monitored by querying the first edge device or the second edge device without gathering and parsing the sensor observations stranded at the first location and the sensor observations stranded at the second location.

2. The system of claim 1, wherein:

the first sensor node is connected to one or more data nodes; and population of the first sensor node based on the first sensor observation includes population of the one or more data nodes based on the first sensor observation.

3. The system of claim 2, wherein the one or more data nodes are generated for the first sensor node based on a type of the first sensor.

4. The system of claim 1, wherein the first sensor node is repopulated by the first edge device responsive to reception, by the first edge device, of a new sensor observation made by the first sensor.

5. The system of claim 1, wherein the oil/gas asset includes a reserve, a drilling rig, a production facility, a pipeline, a pump, a compressor, a storage tank, a transportation vessel, or a refinery.

6. The system of claim 1, wherein dynamic connections are created in the structured graph to monitor the condition of the oil/gas asset.

7. The system of claim 1, wherein:

the first edge device is in the first location and the second edge device is in the second location;

a first location node is generated for the first location and a second location node is generated for the second location; and the first edge device node is connected to the first location node and the second edge device node is connected to the second location node.

8. The system of claim 1, wherein the oil/gas asset includes a piece of oil/gas equipment, and automatic shutdown or automatic start-up of the piece of oil/gas equipment is performed responsive to the condition of the oil/gas asset satisfying a criterion.

9. The system of claim 1, wherein oil/gas asset includes a piece of oil/gas equipment, and operating parameters of the piece of oil/gas equipment is automatically modified responsive to the condition of the oil/gas asset satisfying a criterion.

10. The system of claim 1, wherein one or more other graphs are connected to the structured graph, the connection of the one or more other graphs to the structured graph expanding querying capabilities of the structured graph.

11. A method for graphically integrating stranded sensor data, the method comprising:

generating, by a first edge device, a first edge device node for the first edge device and a first set of sensor nodes for a first set of sensors connected to the first edge device, the first set of sensors configured to make sensor observations for a first location of an oil/gas asset, the sensor observations made by the first set of sensors stranded at the first location, the first edge device configured to locally manage the sensor observations made by the first set of sensors for the first location of the oil/gas asset, the first set of sensors including at least a first sensor, wherein a first sensor node is generated for the first sensor, the first set of sensor nodes connected to the first edge device node;

receiving, by the first edge device, the sensor observations made by the first set of sensors, wherein a first sensor observation made by the first sensor is received;

populating, by the first edge device, the first set of sensor nodes based on the sensor observations made by the first set of sensors, wherein the first sensor node is populated based on the first sensor observation made by the first sensor;

generating, by a second edge device, a second edge device node for the second edge device and a second set of sensor nodes for a second set of sensors connected to the second edge device, the second set of sensors configured to make sensor observations for a second location of the oil/gas asset, the sensor observations made by the second set of sensors stranded at the second location, the second edge device configured to locally manage the sensor observations made by the second set of sensors for the second location of the oil/gas asset, the second set of sensors including at least a second sensor, wherein a second sensor node is generated for the second sensor, the second set of sensor nodes connected to the second edge device node;

receiving, by the second edge device, the sensor observations made by the second set of sensors, wherein a second sensor observation made by the second sensor is received; and populating, by the second edge device, the second set of sensor nodes based on the sensor observations made by the second set of sensors, wherein the second sensor node is populated based on the second sensor observation made by the second sensor; wherein:

the first edge device node, the first set of sensor nodes, the second edge device node, and the second set of sensor nodes form a structured graph; and a condition of the oil/gas asset is monitored based on a graph query on the structured graph, wherein the condition of the oil/gas asset is monitored by querying the first edge device or the second edge device without gathering and parsing the sensor observations stranded at the first location and the sensor observations stranded at the second location.

12. The method of claim 11, wherein:

the first sensor node is connected to one or more data nodes; and population of the first sensor node based on the first sensor observation includes population of the one or more data nodes based on the first sensor observation.

13. The method of claim 12, wherein the one or more data nodes are generated for the first sensor node based on a type of the first sensor.

14. The method of claim 11, wherein the first sensor node is repopulated by the first edge device responsive to reception, by the first edge device, of a new sensor observation made by the first sensor.

15. The method of claim 11, wherein the oil/gas asset includes a reserve, a drilling rig, a production facility, a pipeline, a pump, a compressor, a storage tank, a transportation vessel, or a refinery.

16. The method of claim 11, wherein dynamic connections are created in the structured graph to monitor the condition of the oil/gas asset.

17. The method of claim 11, wherein:

the first edge device is in the first location and the second edge device is in the second location;

a first location node is generated for the first location and a second location node is generated for the second location; and the first edge device node is connected to the first location node and the second edge device node is connected to the second location node.

18. The method of claim 11, wherein the oil/gas asset includes a piece of oil/gas equipment, and automatic shutdown or automatic start-up of the piece of oil/gas equipment is performed responsive to the condition of the oil/gas asset satisfying a criterion.

19. The method of claim 11, wherein oil/gas asset includes a piece of oil/gas equipment, and operating parameters of the piece of oil/gas equipment is automatically modified responsive to the condition of the oil/gas asset satisfying a criterion.

20. The method of claim 11, wherein one or more other graphs are connected to the structured graph, the connection of the one or more other graphs to the structured graph expanding querying capabilities of the structured graph.

* * * * *